(12) United States Patent
Lim et al.

(10) Patent No.: US 11,991,150 B2
(45) Date of Patent: May 21, 2024

(54) APPARATUS AND METHOD FOR PROVIDING REMOTE WORK ENVIRONMENT

(71) Applicant: ELECTRONICS AND TELECOMMUNICATIONS RESEARCH INSTITUTE, Daejeon (KR)

(72) Inventors: Gak-Soo Lim, Daejeon (KR); Sung-Jin Kim, Daejeon (KR); Jung-Hwan Kang, Daejeon (KR); Seung-Hun Han, Daejeon (KR); Byung-Joon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 415 days.

(21) Appl. No.: 17/467,793

(22) Filed: Sep. 7, 2021

(65) Prior Publication Data

US 2022/0103524 A1 Mar. 31, 2022

(30) Foreign Application Priority Data

Sep. 25, 2020 (KR) .................. 10-2020-0125152
Jul. 20, 2021 (KR) .................. 10-2021-0094867

(51) Int. Cl.
*H04L 9/40* (2022.01)

(52) U.S. Cl.
CPC .......... *H04L 63/0272* (2013.01); *H04L 63/20* (2013.01); *H04L 63/0428* (2013.01)

(58) Field of Classification Search
None
See application file for complete search history.

(56) References Cited

U.S. PATENT DOCUMENTS

| 9,935,772 B1* | 4/2018 | Madisetti ............ G06F 21/6209 |
| 10,885,226 B1* | 1/2021 | Joshi ...................... G06F 21/604 |
| 2002/0091801 A1* | 7/2002 | Lewin ................... H04L 65/613 |
| | | 709/219 |

(Continued)

FOREIGN PATENT DOCUMENTS

| KR | 10-2007-0038618 A | 4/2007 |
| KR | 10-2014-0019574 A | 2/2014 |

(Continued)

*Primary Examiner* — Kaveh Abrishamkar
(74) *Attorney, Agent, or Firm* — LRK PATENT LAW FIRM (57) ABSTRACT

Disclosed herein are an apparatus and method for providing a remote work environment. The apparatus includes one or more processors and executable memory for storing at least one program executed by the one or more processors. The at least one program performs Virtual Private Network (VPN) authentication in response to a request for remote access to a work network from a user terminal, performs user authentication in order to connect the user terminal that succeeds in VPN authentication to the work network, decrypts the encrypted user data area of the user terminal that is connected to the work network, and provides the remote work environment to the user terminal based on the user data area through the work network.

12 Claims, 7 Drawing Sheets

(56) References Cited

U.S. PATENT DOCUMENTS

| | | | | |
|---|---|---|---|---|
| 2002/0118671 | A1* | 8/2002 | Staples | H04L 67/563 |
| | | | | 370/352 |
| 2006/0184998 | A1* | 8/2006 | Smith | H04L 41/0253 |
| | | | | 726/3 |
| 2007/0050362 | A1* | 3/2007 | Low | G06F 21/6245 |
| 2008/0005791 | A1* | 1/2008 | Gupta | H04L 63/0272 |
| | | | | 726/15 |
| 2008/0060080 | A1* | 3/2008 | Lim | H04L 63/107 |
| | | | | 726/26 |
| 2008/0098472 | A1* | 4/2008 | Enomoto | H04L 63/029 |
| | | | | 726/12 |
| 2013/0160084 | A1* | 6/2013 | Hansen | G06F 21/6218 |
| | | | | 726/4 |
| 2016/0087942 | A1* | 3/2016 | Yaguchi | H04L 63/08 |
| | | | | 726/4 |
| 2016/0255117 | A1* | 9/2016 | Sinha | G06F 21/56 |
| | | | | 726/1 |
| 2017/0078248 | A1* | 3/2017 | Bian | H04L 63/20 |
| 2017/0163675 | A1* | 6/2017 | Warman | H04L 63/1425 |
| 2020/0021660 | A1* | 1/2020 | Komatsu | H04L 67/12 |
| 2020/0151345 | A1* | 5/2020 | Chauhan | G06F 21/16 |

FOREIGN PATENT DOCUMENTS

| | | |
|---|---|---|
| KR | 10-2018-0072996 A | 7/2018 |
| KR | 10-2019-0009497 A | 1/2019 |
| KR | 10-2251579 B1 | 5/2021 |

\* cited by examiner

APPARATUS AND METHOD FOR PROVIDING REMOTE WORK ENVIRONMENT

CROSS REFERENCE TO RELATED APPLICATIONS

This application claims the benefit of Korean Patent Application No. 10-2020-0125152, filed Sep. 25, 2020, and No. 10-2021-0094867, filed Jul. 20, 2021, which are hereby incorporated by reference in their entireties into this application.

BACKGROUND OF THE INVENTION

1. Technical Field

The present invention relates to technology for remote security, provision of a remote work environment, and user authentication for establishing a secure remote work environment.

2. Description of Related Art

The present invention relates to technology for remote security, provision of a remote work environment, and user authentication for establishing a secure remote work environment.

Currently, remote work environments are established such that a user at a remote site, other than a workplace area, accesses a work system through a VPN connection and performs work. However, the general process of providing a remote work environment that is currently applied is exposed to security threats from multi-homing. The term 'multi-homing' indicates the situation in which a terminal, such as a single PC or laptop used for work, is allowed to access both the Internet and a work network. This is an environment that violates the principle of network separation, which protects a work system by separating a terminal for Internet access from a terminal used for work, and is an environment that makes the work network very vulnerable to security risks (e.g., malicious code on the Internet may spread into the work network). The current remote work environment is configured such that a user boots a terminal, logs on to an Operating System (OS), executes a VPN client, and accesses a work network. Here, after the user logs on to the OS and before the user executes the VPN client, the terminal is in the state in which access to the Internet is possible. Here, if the user accesses the work network after the terminal is infected with malicious code during access to the Internet, the malicious code may spread to the work network. Therefore, measures for preemptively addressing security threats through network control of a terminal for remote work, such as technology for maintaining access only to a work network via a VPN while preventing a user from arbitrary accessing the Internet in a remote work environment, are required.

As another security threat in a remote work environment, there is the concern of data leakage in the event of loss of a terminal. In the case of remote work, a workplace is an arbitrary place selected by an individual user, rather than a place dedicated for work that is equipped with physical security systems. Accordingly, there is the possibility that a terminal may be stolen or taken away or that a terminal may be lost due to the negligence of a user. The loss of a terminal results in various security threats, such as the possibility of leakage of work data stored in the lost terminal, access to a work network by an unauthorized user using the lost terminal, and the like. Therefore, a remote work environment requires security techniques for user authentication, terminal management, data leakage prevention, and the like.

Meanwhile, Korean Patent No. 10-2251579, titled "Method and apparatus for supporting remote control", discloses a method and apparatus for supporting remote control, through which remote control privileges are capable of being flexibly set while security is maintained.

SUMMARY OF THE INVENTION

An object of the present is to support the provision of a remote work environment in conjunction with a user terminal in order to establish a remote work environment having improved security while maintaining policies suitable for the work environment.

In order to accomplish the above object, an apparatus for providing a remote work environment according to an embodiment of the present invention includes one or more processors and executable memory for storing at least one program executed by the one or more processors. The at least one program is configured to perform Virtual Private Network (VPN) authentication in response to a request for remote access to a work network from a user terminal, to perform user authentication in order to connect the user terminal, which succeeds in the VPN authentication, to the work network, to decrypt the encrypted user data area of the user terminal that is connected to the work network, and to provide the remote work environment to the user terminal based on the user data area through the work network.

Here, the at least one program may apply network management policies to the Operating System (OS) of the user terminal.

Here, the at least one program may set a security-related function for controlling the user terminal using the network management policies.

Here, the at least one program may restrict at least one of a change in network settings, input/output of USB data, and a screen capture function based on the network management policies.

Here, when the VPN authentication succeeds, the at least one program may maintain a connection of the user terminal to the work network, may make a setting to restrict a change in network settings based on the network management policies, and may make a setting to prevent the user terminal from connecting to an external Internet.

Here, the user data area is capable of being accessed through the Operating System (OS) of the user terminal by being decrypted only while the user terminal maintains a connection to the work network, and may be encrypted when the connection to the work network is disconnected.

Also, in order to accomplish the above object, a method for providing a remote work environment, performed by an apparatus for providing the remote work environment, according to an embodiment of the present invention includes performing Virtual Private Network (VPN) authentication in response to a request for remote access to a work network from a user terminal; performing user authentication in order to connect the user terminal, which succeeds in the VPN authentication, to the work network; decrypting the encrypted user data area of the user terminal that is connected to the work network; and providing the remote work environment to the user terminal based on the user data area through the work network.

Here, the method may further include applying network management policies to the Operating System (OS) of the user terminal.

Here, applying the network management policies may be configured to set a security-related function for controlling the user terminal using the network management policies.

Here, applying the network management policies may be configured to restrict at least one of a change in network settings, input/output of USB data, and a screen capture function based on the network management policies.

Here, applying the network management policies may be configured to maintain a connection of the user terminal to the work network, to make a setting to restrict a change in network settings based on the network management policies, and to make a setting to prevent the user terminal from connecting to an external Internet when the VPN authentication succeeds.

Here, the user data area is capable of being accessed through the Operating System (OS) of the user terminal by being decrypted only while the user terminal maintains a connection to the work network, and may be encrypted when the connection to the work network is disconnected.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 1:
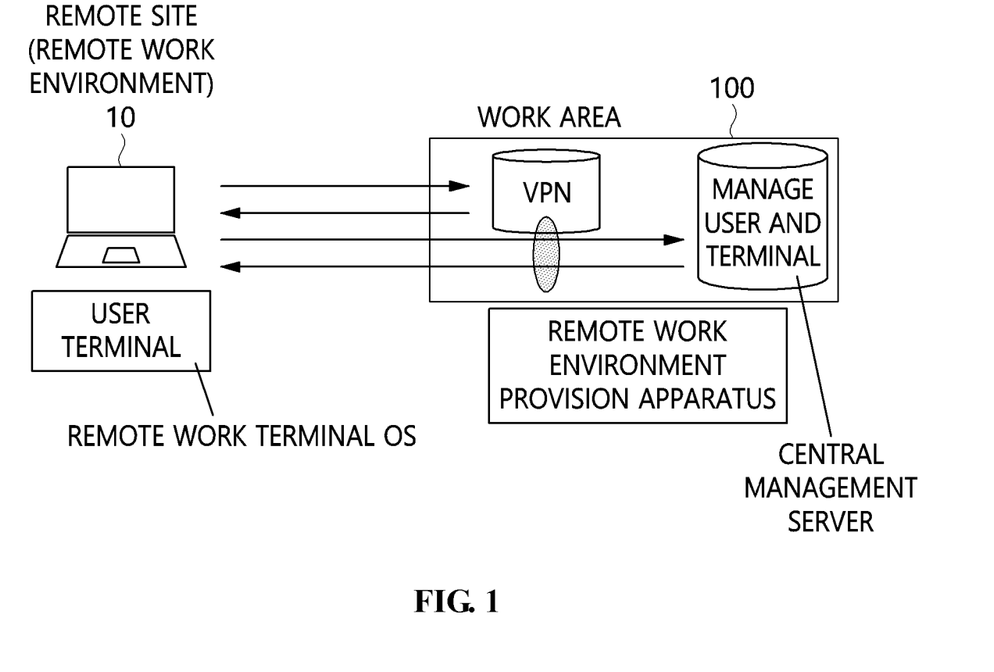
FIG. 1 is a view illustrating a system for providing a remote work environment according to an embodiment of the present invention.

FIG. 1 is a view illustrating a system for providing a remote work environment according to an embodiment of the present invention.

Referring to FIG. 1, the system for providing a remote work environment according to an embodiment of the present invention includes a user terminal 10 and a remote work environment provision apparatus 100.

The user terminal 10 accesses a work area through the remote work environment provision apparatus 100, thereby being provided with a remote work environment.

The remote work environment provision apparatus 100 may include a VPN device for a secure network connection, a central management server for managing a user and a terminal, and a remote work system server.

The user terminal 10 may be a PC, a laptop, a smart device, or the like, which is used by the user in order to perform work at a remote site.

Here, the user terminal 10 may establish a connection to the work area and perform work using a remote work terminal OS installed therein.

In order to ensure the security of the remote work environment through the remote work environment provision apparatus 100, the remote work terminal OS may perform functions of VPN authentication, user authentication, user data area decryption, and terminal policy application after the terminal is booted.

The work area is an internal work network that is established for a work system and a workplace physically designated by an organization, a company, or the like, and the user terminal is required to establish a network connection using a VPN in order to remotely perform work.

The VPN authentication function may enable establishment of a secure network connection to the work network by interworking with the VPN device in the work area, and the functions of user authentication, user data area decryption, and terminal policy application may ensure security in the remote work environment by interworking with the central management server in the work network.

Figure 2:
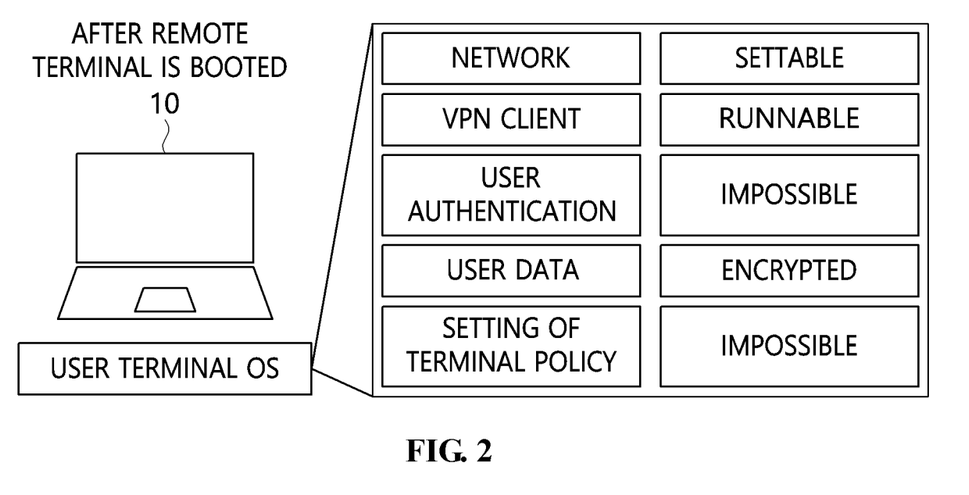
FIG. 2 is a view illustrating functions of an operating system (OS) of a user terminal and the state of the user terminal after booting according to an embodiment of the present invention.

FIG. 2 is a view illustrating the functions of an OS of a user terminal and the state of the user terminal after booting according to an embodiment of the present invention.

Referring to FIG. 2, it can be seen that the states of respective functions of the user terminal 10 after booting are illustrated.

When power is input to the user terminal 10, a boot sequence before an OS logon phase may be performed.

Here, only configuration of network settings and execution of a VPN client are allowed in the user terminal 10, and other functions of the terminal are not available because logging in to the OS has not yet been performed.

Here, a user data area in the disk of the user terminal 10 is not accessible because it is encrypted in advance, and user authentication, terminal policy establishment, and the like are not capable of being performed because a connection to the remote work environment provision apparatus 100 is required therefor.

As described above, the user terminal 10 in the remote work environment is in the state in which the functions thereof are limited before it is connected to the remote work environment provision apparatus 100 after it is booted, and the terminal functions may be enabled to perform remote work when both establishment of a connection to the central management server in the work area through VPN authentication and user authentication succeed.

Figure 3:
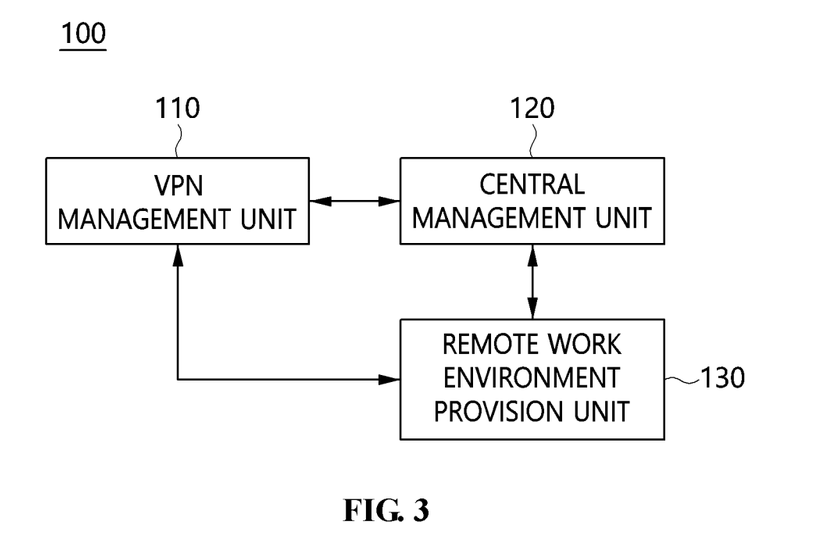
FIG. 3 is a block diagram illustrating an apparatus for providing a remote work environment according to an embodiment of the present invention.

FIG. 3 is a block diagram illustrating an apparatus for providing a remote work environment according to an embodiment of the present invention.

Figure 4:
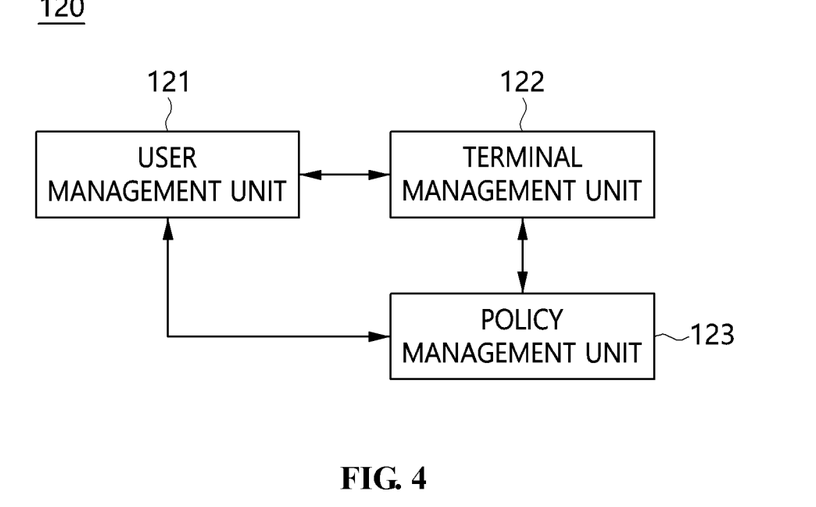
FIG. 4 is a block diagram illustrating in detail an example of the central management unit illustrated in FIG. 3.

Referring to FIG. 3, the remote work environment provision apparatus 100 according to an embodiment of the present invention includes a VPN management unit 110, a central management unit 120, and a remote work environment provision unit 130. FIG. 4 is a block diagram illustrating in detail an example of the central management unit illustrated in FIG. 3.

A work network is autonomously established as a closed network by an organization, a company, or the like, and the user terminal 10 is able to access the work network via a network only after authentication through VPN authentication succeeds.

The VPN management unit 110 may perform Virtual Private Network (VPN) authentication in response to a request for remote access to the work network from the user terminal 10.

Here, when VPN authentication succeeds, the VPN management unit 110 may maintain a connection of the user terminal 10 to the work network, may make a setting to restrict a change in network settings based on network management policies, and may make a setting to prevent the user terminal from connecting to the external Internet.

Here, the VPN management unit 110 performs the VPN authentication procedure before logging in to the OS of the user terminal 10 is performed, and unless VPN authentication is performed, the user is not able to use the user terminal itself because the user is not able to log on to the OS of the user terminal 10.

The central management unit 120 may perform user authentication in order to connect the user terminal, which has succeeded in VPN authentication, to the work network, may decrypt the encrypted user data area of the user terminal connected to the work network, and may apply the network management policies to the OS of the user terminal.

Referring to FIG. 4, the central management unit 120 may include a user management unit 121, a terminal management unit 122, and a policy management unit 123.

The user management unit 121 may perform user authentication for connecting a user terminal that has succeeded in VPN authentication to the work network.

Here, the user management unit 121 may manage information about users who intend to connect to the work system of an organization, a company, or the like through the remote work environment provided thereby.

Here, the user management unit 121 issues user information, such as an ID, a password, personal information, and the like, in advance to the user terminal 10 such that the user information is capable of being used as an authentication means.

Here, the user management unit 121 receives a request for user authentication from the user terminal 10 using the previously registered ID and password, and may transmit the result of user authentication performed by the organization, the company, or the like to the user terminal 10.

Here, through a VPN connection, the user management unit 121 performs user authentication only for a user terminal 10 that has succeeded in VPN authentication, and the user is able to log on to the OS installed in the user terminal 10 only when both VPN authentication and user authentication succeed.

Here, the user management unit 121 may perform the process of comparing the user ID and password for logging in to the OS with the previously registered user information, and may return a user authentication result to the OS of the user terminal 10.

Upon receiving the user authentication result, the OS of the user terminal 10 allows logon thereto when user authentication succeeds, and may provide a remote work environment such that a user is able to use the terminal.

When user authentication fails, the OS of the user terminal 10 disables logon, and thus user is not able to use the terminal.

A network connection between the user terminal 10 and the work network may be guaranteed through VPN authentication, and functions of the user terminal 10 may be restricted such that a user is allowed to use the user terminal 10 only when user authentication succeeds.

The user terminal 10 may be forced to access only a work network by restricting the functions thereof, whereby the security of remote work may be ensured.

That is, the central management unit 120 performs both VPN authentication and user authentication, and makes the terminal itself unavailable unless a secure network is guaranteed for the user terminal 10 at the remote site, thereby improving security.

Also, the terminal management unit 122 may decrypt the encrypted user data area in the user terminal 10 that is connected to the work network.

The terminal management unit 122 may decrypt the encrypted user data area in the disk of the user terminal so as to enable access thereto when the user terminal 10 succeeds in user authentication.

The remote work terminal OS of the user terminal 10 manages the user data area to maintain the encrypted state before the user logs on thereto after booting.

The encrypted user data area may enable security to be ensured in the remote work environment, and may prevent work data leakage, which can occur in the event of loss of the terminal for remote work.

The user data area may maintain the encrypted state after installation in the user terminal 10.

Here, the user data area may store data required for remote work therein.

Here, the terminal management unit 122 may decrypt the user data area when logon to the OS of the user terminal 10 is performed through VPN authentication and user authentication.

Because data in the terminal is in the encrypted state before VPN authentication, a user or an attacker is not able to access the data in the user terminal 10.

Here, the user data area is decrypted only while the user terminal maintains the connection to the work network, and is capable of being accessed through the OS of the user terminal. The user data area is encrypted when the connection to the work network is disconnected.

Here, when the user logs out of the OS of the user terminal 10 or terminates the user terminal 10, the user terminal 10 encrypts the user data area again, thereby securely protecting the data stored in the user data area.

Here, the terminal management unit 122 transmits a specific value for decrypting the user data area to the user terminal 10, and the user terminal 10 may decrypt the user data area in the disk using the received specific value.

Here, the terminal management unit 122 decrypts the user data area only when VPN authentication and user authentication succeed, thereby preventing data leakage. Also, the terminal management unit 122 automatically encrypts the data area when the user logs out, thereby fundamentally preventing leakage of data stored in the terminal, which can occur in the event of loss of the terminal.

Here, because the terminal management unit 122 decrypts the user data area only after the VPN authentication and user authentication step is performed, users other than the authenticated user are not able to access the user data area.

Also, the policy management unit 123 may apply network management policies to the OS of the user terminal.

Here, the policy management unit 123 may set a security-related function for controlling the user terminal using the network management policies.

Here, the policy management unit 123 may restrict at least one of a change in network settings, input/output of USB data, and a screen capture function based on the network management policies.

The network management policies may include a function to restrict or control some of the functions of the terminal used by a user based on the security policies of the organization or company that provides the remote work environment.

Here, when user authentication succeeds, the policy management unit 123 transmits the network management policies to the OS of the user terminal 10, thereby controlling the function of the OS.

Here, the policy management unit 123 may apply policies for media control functions, such as forbidding a change in network settings of the remote work terminal OS used by the user terminal 10, forbidding use of USB memory, forbidding use of a CD/DVD drive, forbidding use of Bluetooth, forbidding screen capture, and the like.

Here, the policy management unit 123 transmits a policy file set by an administrator to the user terminal 10 that has succeeded in user authentication, and the user terminal 10 applies the received policy file, thereby applying the network management policies to the OS.

The user terminal 10 to which the policies are applied supports performing work while complying with the security standards of an organization, a company, or the like, and may support security maintenance by preventing the user from arbitrarily editing network settings and accessing the Internet.

The purpose of terminal control is to comply with the security policies of an organization or a company when the terminal is used for remote work, and when a user arbitrarily changes network settings, a VPN connection is forcibly disconnected, whereby a secure network connection for remote work may be maintained.

The remote work environment provision unit 130 may provide a remote work environment to the user terminal based on the user data area through the work network.

Figure 5:
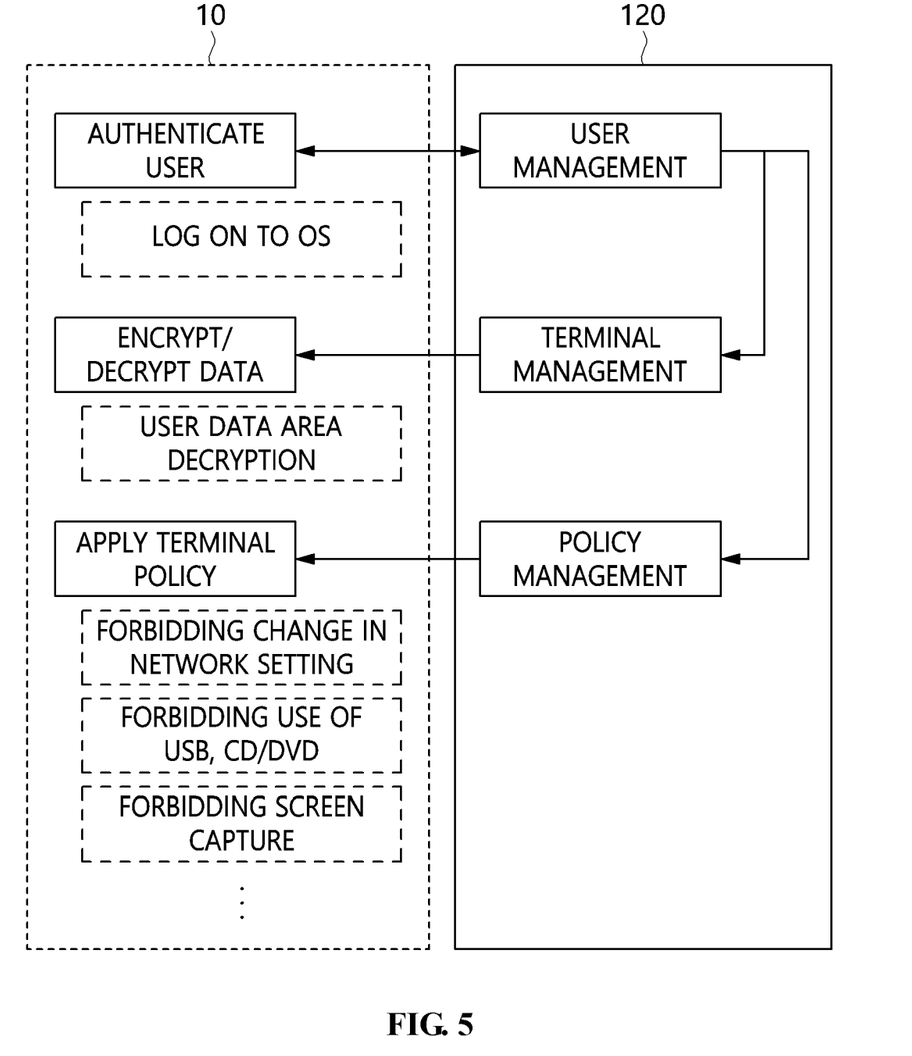
FIG. 5 is a view illustrating the process of ensuring the security of a user terminal using a central management function according to an embodiment of the present invention.

FIG. 5 is a view illustrating a process for ensuring the security of a user terminal using a central management function according to an embodiment of the present invention.

Referring to FIG. 5, the central management function of the central management unit 120 may include a user management function, a terminal management function, and a policy management function.

The user authentication function may perform user authentication for a user terminal such that a user who intends to perform remote work is allowed to access the work network after VPN authentication.

The user authentication function may perform the process of comparing a user ID and password for logging in to the OS with previously registered user information, and may return a user authentication result to the OS of the user terminal 10.

Upon receiving the user authentication result, the OS of the user terminal 10 allows logon thereto when user authentication succeeds, thereby providing a remote work environment such that the user is able to use the terminal.

When user authentication fails, the OS of the user terminal 10 disables logon thereto, and a user is not able to use the terminal.

A network connection of the user terminal 10 to the work network is guaranteed through VPN authentication, and the functions of the user terminal 10 may be restricted such that the user is allowed to use the user terminal 10 only when user authentication succeeds.

The user terminal 10 may be forced to access only a work network by restricting the functions thereof, whereby the security of remote work may be ensured.

The terminal management function is configured to transmit a specific value for decrypting a user data area to the user terminal 10, and the user terminal 10 may decrypt the user data area in the disk using the received specific value.

The user data area, in which user data is stored, has been encrypted in advance, and when user authentication succeeds, the user data area may be decrypted such that the user is able to use the corresponding area.

The terminal management function may prevent data leakage by decrypting the user data area only after VPN authentication and user authentication, and when the user logs out, the data area is automatically encrypted, whereby leakage of data stored in the terminal, which can occur in the event of loss of the terminal, may be fundamentally prevented.

Here, because the terminal management function is configured to decrypt the user data area only after the VPN authentication and user authentication step is performed, users other than the authenticated user are not able to access the user data area.

The policy management function may apply policies for media control functions, such as forbidding a change in network settings of the remote work terminal OS used by the user terminal 10, forbidding use of USB memory, forbidding use of a CD/DVD drive, forbidding use of Bluetooth, forbidding screen capture, and the like.

Here, the policy management function may be configured to transmit a policy file set by an administrator to the user terminal 10 that has succeeded in user authentication, and the user terminal 10 applies the received policy file, thereby applying the network management policies to the OS.

The user terminal 10 to which the policies are applied supports performing work while complying with the security standards of an organization, a company, or the like, and may support security maintenance by preventing the user from arbitrarily editing network settings and accessing the Internet.

Figure 6:
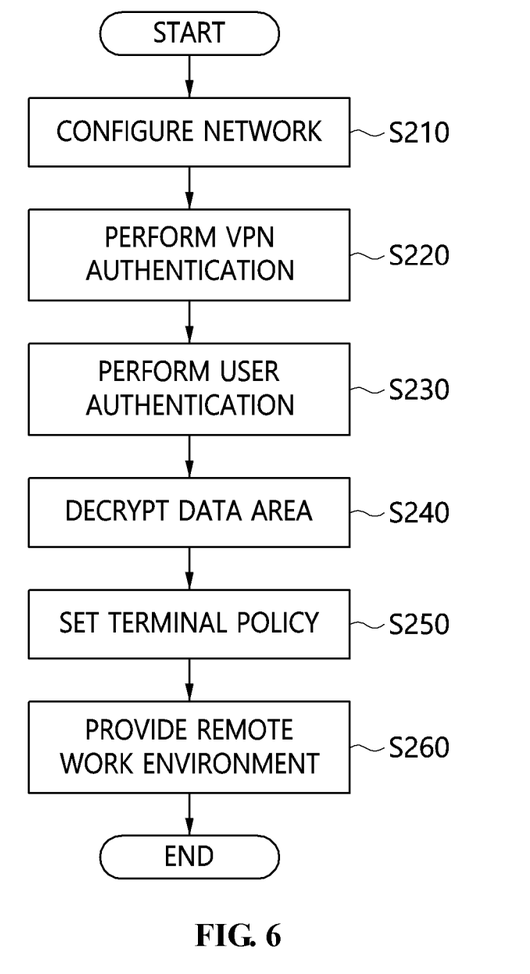
FIG. 6 is a flowchart illustrating a method for providing a remote work environment according to an embodiment of the present invention.

FIG. 6 is a flowchart illustrating a method for providing a remote work environment according to an embodiment of the present invention.

Referring to FIG. 6, in the method for providing a remote work environment according to an embodiment of the present invention, first, network settings may be configured at step S210.

That is, at step S210, when power is input to a user terminal 10, the user terminal 10 may be connected to the Internet using a network setting function in an Operating System (OS).

Here, at step S210, the user terminal 10 may request, over the Internet, a remote work environment provision apparatus 100 to connect the user terminal 10 to a work network in order to be provided with a remote work environment.

Also, in the method for providing a remote work environment according to an embodiment of the present invention, VPN authentication may be performed at step S220.

That is, at step S220, Virtual Private Network (VPN) authentication may be performed in response to the request for remote access to the work network from the user terminal 10.

Here, at step S220, when VPN authentication succeeds, the connection between the user terminal 10 and the work network may be maintained, a setting may be made to restrict a change in network settings based on network management policies, and a setting may be made to prevent the user terminal from connecting to the external Internet.

Here, at step S220, the VPN authentication procedure may be performed before logging in to the OS of the user terminal 10 is performed. Unless VPN authentication of the user terminal 10 is performed, the user is not able to use the user terminal itself because the user is not able to log on to the OS of the user terminal 10.

Also, in the method for providing a remote work environment according to an embodiment of the present invention, user authentication may be performed at step S230.

That is, at step S230, user authentication may be performed in order to connect the user terminal, which has succeeded in VPN authentication, to the work network.

Here, at step S230, an organization, company, or the like may manage information about users who intend to connect to the work system thereof through a remote work environment provided thereby.

Here, at step S230, user information, such as an ID, a password, personal information, and the like, is issued in advance to the user terminal 10 such that the user information is capable of being used as an authentication means.

Here, at step S230, a request for user authentication is received from the user terminal 10 using a previously registered ID and password, and the result of user authentication performed by the organization or the company may be transmitted to the user terminal 10.

Here, at step S230, only for the user terminal 10 that has succeeded in VPN authentication, user authentication is performed through a VPN connection, and the user is able to log on to the OS installed in the user terminal 10 only when both VPN authentication and user authentication succeed.

Here, at step S230, the process of comparing a user ID and password for logging in to the OS with previously registered user information is performed, and a user authentication result may be returned to the OS of the user terminal 10.

Here, at step S230, upon receiving the user authentication result, the OS of the user terminal 10 allows logon thereto when user authentication succeeds, thereby providing a remote work environment such that the user is able to use the terminal.

Here, at step S230, when user authentication fails, the OS of the user terminal 10 disables logon thereto, and the user is not able to use the terminal.

That is, at step S230, both VPN authentication and user authentication are performed such that the use of the terminal itself is not allowed unless a secure network is ensured for the user terminal 10 at a remote site, whereby security may be improved.

Also, in the method for providing a remote work environment according to an embodiment of the present invention, a user data area may be decrypted at step S240.

That is, at step S240, the encrypted user data area of the user terminal 10 that is connected to the work network may be decrypted.

Here, at step S240, the encrypted user data area in the disk of the user terminal may be decrypted so as to allow access thereto when the user terminal 10 succeeds in user authentication.

The remote work terminal OS of the user terminal 10 manages the user data area so as to maintain the encrypted state before user logon after booting.

The encrypted user data area may enable security to be ensured in a remote work environment, and may prevent work data leakage, which can occur in the event of loss of the terminal for remote work.

The user data area may maintain the encrypted state after installation in the user terminal 10.

Here, the user data area may store data required for remote work therein.

Here, at step S240, when logon to the OS of the user terminal 10 is performed through VPN authentication and user authentication, the user data area may be decrypted.

Because data in the terminal is in the encrypted state before VPN authentication, a user or an attacker is not able to access the data in the user terminal 10.

Here, the user data area is decrypted only while the user terminal maintains the connection to the work network, and is capable of being accessed through the OS of the user terminal. The user data area may be encrypted when the connection to the work network is disconnected.

Here, at step S240, when the user logs out of the OS of the user terminal 10 or terminates the user terminal 10, the user terminal 10 encrypts the user data area again, thereby securely protecting the data stored in the user data area.

Here, at step S240, a specific value for decrypting the user data area is transmitted to the user terminal 10, and the user terminal 10 may decrypt the user data area in the disk using the received specific value.

Here, at step S240, the user data area is decrypted only when VPN authentication and user authentication succeed, whereby data leakage may be prevented. Also, the data area is automatically encrypted when the user logs out, whereby leakage of data in the terminal, which can occur in the event of loss of the terminal, may be fundamentally prevented.

Here, at step S240, because the user data area is decrypted only after the VPN authentication and user authentication step is performed, users other than the authenticated user are not able to access the user data area.

Also, in the method for providing a remote work environment according to an embodiment of the present invention, terminal policies may be set at step S250.

That is, at step S250, network management policies may be applied to the OS of the user terminal.

Here, at step S250, a security-related function for controlling the user terminal may be set using the network management policies.

Here, at step S250, at least one of a change in network settings, input/output of USB data, and a screen capture function may be restricted based on the network management policies.

The network management policies may include a function to restrict or control some of the functions of the terminal used by a user based on the security policies of the organization, company, or the like that provides the remote work environment.

Here, at step S250, when user authentication succeeds, the network management policies are transmitted to the OS of the user terminal 10, whereby the functions of the OS may be controlled.

Here, at step S250, policies for media control functions, such as forbidding a change in network settings of the remote work terminal OS used by the user terminal 10, forbidding use of USB memory, forbidding use of a CD/DVD drive, forbidding use of Bluetooth, forbidding screen capture, and the like, may be applied.

Here, at step S250, a policy file set by an administrator is transmitted to the user terminal 10, which has succeeded in user authentication, and the user terminal 10 applies the received policy file, thereby applying the network management policies to the OS.

The user terminal 10 to which the policies are applied may support performing work while complying with security standards of an organization, a company, or the like, and may support maintenance of security by preventing the user from arbitrarily editing network settings and accessing the Internet.

The purpose of terminal control is to comply with the security policies of an organization, a company or the like when a terminal for remote work is used, and when a user arbitrarily changes network settings, a VPN connection is forcibly disconnected, whereby a secure network connection for remote work may be maintained.

Also, in the method for providing a remote work environment according to an embodiment of the present invention, the remote work environment may be provided at step S260.

That is, at step S260, through the work network, the remote work environment may be provided to the user terminal based on the user data area.

Figure 7:
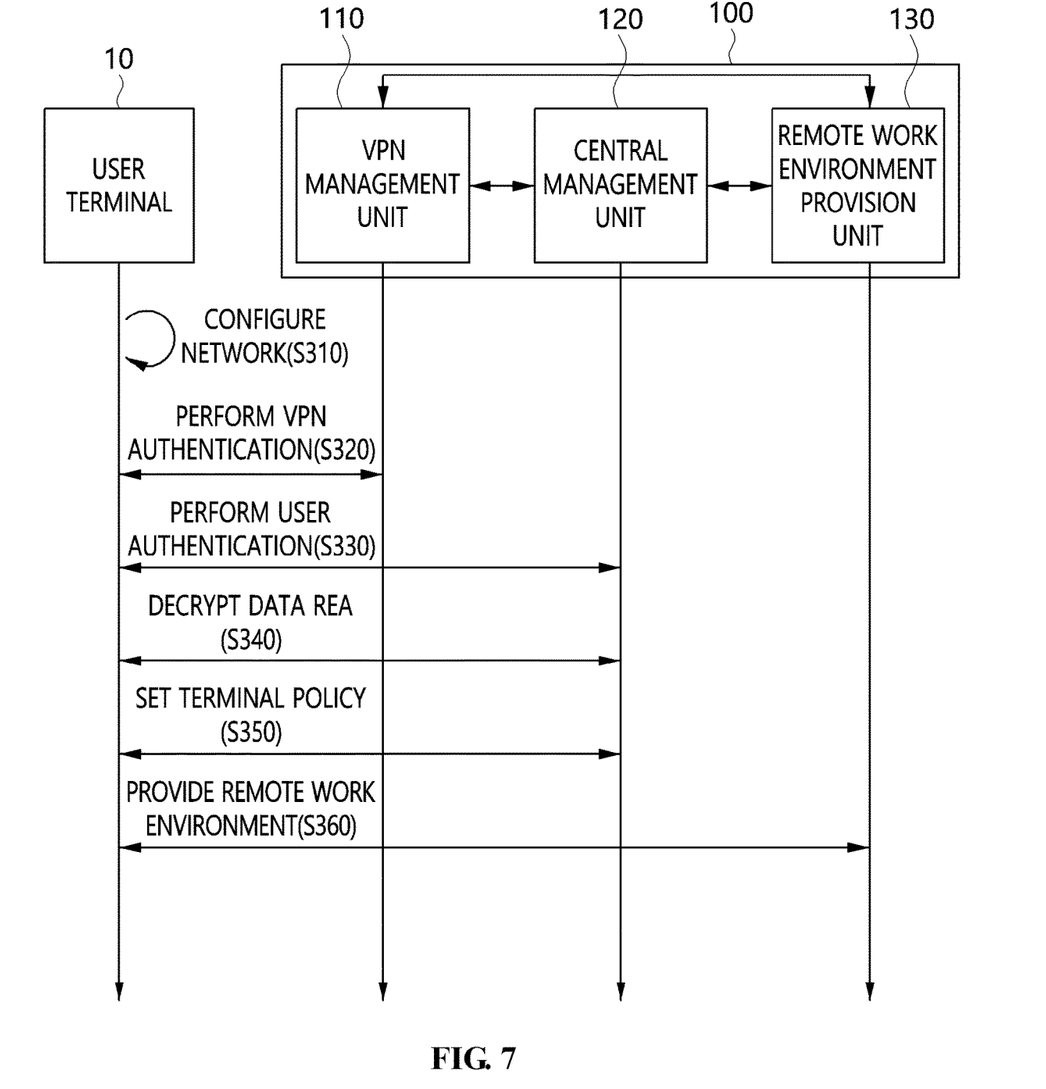
FIG. 7 is a sequence diagram illustrating a method for providing a remote work environment according to an embodiment of the present invention.

FIG. 7 is a sequence diagram illustrating a method for providing a remote work environment according to an embodiment of the present invention.

In a conventional remote work environment, performing work using a terminal is configured to log on to an OS after the terminal completes booting and to connect the terminal to the Internet using a network setting function in the OS in order to respond to a security threat based on multi-homing. At this time, unless the user performs VPN tunneling using a VPN client, the environment of the terminal becomes the same as the environment of terminals capable of connecting to the Internet, which are generally used in homes, Internet cafés, and the like. Accordingly, the user can freely use the terminal and arbitrarily accesses Internet sites, and the terminal may become infected with malware when using the Internet. After that, when the same terminal is used to access a work network via a VPN, there is the possibility of malware on the Internet propagating to the work area. The behavior of accessing both the Internet and a work network using the same terminal is referred to as multi-homing, and measures against such behavior are required because it is a severe security threat to the work network.

To this end, as illustrated in FIG. 7, Internet access is blocked through VPN authentication before a user logs on to the OS, and a remote work environment is provided to the user terminal 10 that succeeds in both VPN authentication and user authentication, whereby measures to preemptively addressing a security threat arising from multi-homing may be provided.

Referring to FIG. 7, in the method for providing a remote work environment according to an embodiment of the present invention, first, network settings may be configured at step S310.

That is, at step S310, when power is input to a user terminal 10, the user terminal 10 may be connected to the Internet using a network setting function in an Operating System (OS).

Here, at step S310, the user terminal 10 may request, over the Internet, a remote work environment provision apparatus 100 to connect the user terminal 10 to a work network in order to be provided with a remote work environment.

Also, in the method for providing a remote work environment according to an embodiment of the present invention, VPN authentication may be performed at step S320.

That is, at step S320, Virtual Private Network (VPN) authentication may be performed in response to the request for remote access to the work network from the user terminal 10.

Here, at step S320, when VPN authentication succeeds, the connection between the user terminal 10 and the work network may be maintained, a setting may be made to restrict a change in network settings based on network management policies, and a setting may be made to prevent the user terminal from connecting to the external Internet.

Here, at step S320, the VPN authentication procedure may be performed before logging in to the OS of the user terminal 10 is performed. Unless VPN authentication of the user terminal 10 is performed, the user is not able to use the user terminal itself because the user is not able to log on to the OS of the user terminal 10.

Also, in the method for providing a remote work environment according to an embodiment of the present invention, user authentication may be performed at step S330.

That is, at step S330, user authentication may be performed in order to connect the user terminal, which has succeeded in VPN authentication, to the work network.

Here, at step S330, an organization, company, or the like may manage information about users who intend to connect to the work system thereof through a remote work environment provided thereby.

Here, at step S330, user information, such as an ID, a password, personal information, and the like, is issued in advance to the user terminal 10 such that the user information is capable of being used as an authentication means.

Here, at step S330, a request for user authentication is received from the user terminal 10 using a previously registered ID and password, and the result of user authentication performed by the organization or the company may be transmitted to the user terminal 10.

Here, at step S330, only for the user terminal 10 that has succeeded in VPN authentication, user authentication is performed through a VPN connection, and the user is able to log on to the OS installed in the user terminal 10 only when both VPN authentication and user authentication succeed.

Here, at step S330, the process of comparing a user ID and password for logging in to the OS with previously registered user information is performed, and a user authentication result may be returned to the OS of the user terminal 10.

Here, at step S330, upon receiving the user authentication result, the OS of the user terminal 10 allows logon thereto when user authentication succeeds, thereby providing a remote work environment such that the user is able to use the terminal.

Here, at step S330, when user authentication fails, the OS of the user terminal 10 disables logon thereto, and the user is not able to use the terminal.

That is, at step S330, both VPN authentication and user authentication are performed such that the use of the terminal itself is not allowed unless a secure network is ensured for the user terminal 10 at a remote site, whereby security may be improved.

Also, in the method for providing a remote work environment according to an embodiment of the present invention, a user data area may be decrypted at step S340.

That is, at step S340, the encrypted user data area of the user terminal 10 that is connected to the work network may be decrypted.

Here, at step S340, the encrypted user data area in the disk of the user terminal may be decrypted so as to allow access thereto when the user terminal 10 succeeds in user authentication.

The remote work terminal OS of the user terminal 10 manages the user data area so as to maintain the encrypted state before user logon after booting.

The encrypted user data area may enable security to be ensured in a remote work environment, and may prevent work data leakage, which can occur in the event of loss of the terminal for remote work.

The user data area may maintain the encrypted state after installation in the user terminal 10.

Here, the user data area may store data required for remote work therein.

Here, at step S340, when logon to the OS of the user terminal 10 is performed through VPN authentication and user authentication, the user data area may be decrypted.

Because data in the terminal is in the encrypted state before VPN authentication, a user or an attacker is not able to access the data in the user terminal 10.

Here, the user data area is decrypted only while the user terminal maintains the connection to the work network, and is capable of being accessed through the OS of the user terminal. The user data area may be encrypted when the connection to the work network is disconnected.

Here, at step S340, when the user logs out of the OS of the user terminal 10 or terminates the user terminal 10, the user terminal 10 encrypts the user data area again, thereby securely protecting the data stored in the user data area.

Here, at step S340, a specific value for decrypting the user data area is transmitted to the user terminal 10, and the user terminal 10 may decrypt the user data area in the disk using the received specific value.

Here, at step S340, the user data area is decrypted only when VPN authentication and user authentication succeed, whereby data leakage may be prevented. Also, the data area is automatically encrypted when the user logs out, whereby leakage of data in the terminal, which can occur in the event of loss of the terminal, may be fundamentally prevented.

Here, at step S340, because the user data area is decrypted only after the VPN authentication and user authentication step is performed, users other than the authenticated user are not able to access the user data area.

Also, in the method for providing a remote work environment according to an embodiment of the present invention, terminal policies may be set at step S350.

That is, at step S350, network management policies may be applied to the OS of the user terminal.

Here, at step S350, a security-related function for controlling the user terminal may be set using the network management policies.

Here, at step S350, at least one of a change in network settings, input/output of USB data, and a screen capture function may be restricted based on the network management policies.

The network management policies may include a function to restrict or control some of the functions of the terminal used by a user based on the security policies of the organization, company, or the like that provides the remote work environment.

Here, at step S350, when user authentication succeeds, the network management policies are transmitted to the OS of the user terminal 10, whereby the functions of the OS may be controlled.

Here, at step S350, policies for media control functions, such as forbidding a change in network settings of the remote work terminal OS used by the user terminal 10, forbidding use of USB memory, forbidding use of a CD/DVD drive, forbidding use of Bluetooth, forbidding screen capture, and the like, may be applied.

Here, at step S350, a policy file set by an administrator is transmitted to the user terminal 10, which has succeeded in user authentication, and the user terminal 10 applies the received policy file, thereby applying the network management policies to the OS.

The user terminal 10 to which the policies are applied may support performing work while complying with security standards of an organization, a company, or the like, and may support maintenance of security by preventing the user from arbitrarily editing network settings and accessing the Internet.

The purpose of terminal control is to comply with the security policies of an organization, a company or the like when a terminal for remote work is used, and when a user arbitrarily changes network settings, a VPN connection is forcibly disconnected, whereby a secure network connection for remote work may be maintained.

Also, in the method for providing a remote work environment according to an embodiment of the present invention, the remote work environment may be provided at step S360.

That is, at step S360, through the work network, the remote work environment may be provided to the user terminal based on the user data area.

Figure 8:
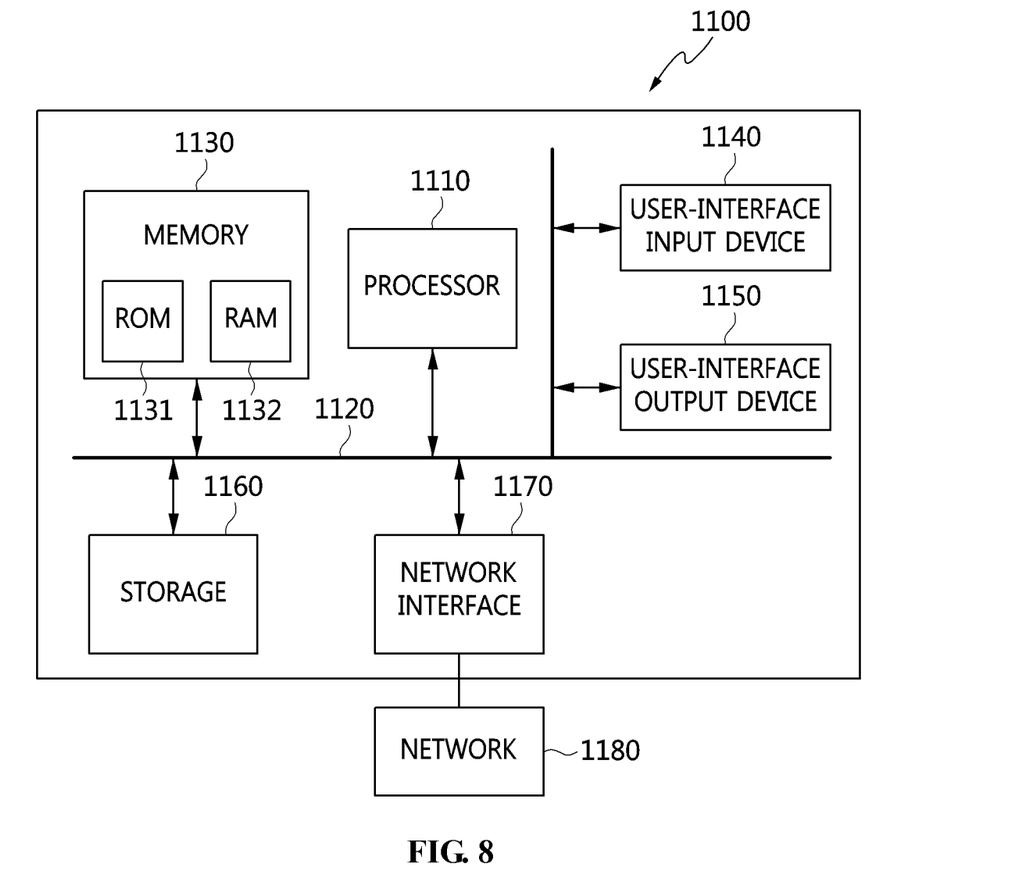
FIG. 8 is a view illustrating a computer system according to an embodiment of the present invention.

FIG. 8 is a view illustrating a computer system according to an embodiment of the present invention.

Referring to FIG. 8, the user terminal 10 and the remote work environment provision apparatus 100 according to an embodiment of the present invention may be implemented in a computer system 1100 including a computer-readable recording medium. As illustrated in FIG. 8, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for providing a remote work environment according to an embodiment of the present invention includes one or more processors 1110 and executable memory 1130 for storing at least one program executed by the one or more processors 1110. The at least one program performs Virtual Private Network (VPN) authentication in response to a request for remote access to a work network from a user terminal, performs user authentication for connecting the user terminal that succeeds in VPN authentication to the work network, decrypts the encrypted user data area of the user terminal that is connected to the work network, and provides a remote work environment to the user terminal based on the user data area through the work network.

Here, the at least one program may apply network management policies to the OS of the user terminal.

Here, the at least one program may set a security-related function for controlling the user terminal using the network management policies.

Here, the at least one program may restrict at least one of a change in network settings, input/output of USB data, and a screen capture function based on the network management policies.

Here, when VPN authentication succeeds, the at least one program may maintain the connection of the user terminal to the work network, make a setting to restrict a change in network settings based on the network management policies, and make a setting to prevent the user terminal from connecting to the external Internet.

Here, the user data area may be accessed through the OS of the user terminal by being decrypted only while the user terminal maintains the connection to the work network, and may be encrypted when the connection to the work network is disconnected.

The present invention may support the provision of a remote work environment in conjunction with a user terminal in order to establish a remote work environment having improved security while maintaining policies suitable for the work environment.

As described above, the apparatus and method for providing a remote work environment according to the present invention are not limitedly applied to the configurations and operations of the above-described embodiments, but all or some of the embodiments may be selectively combined and configured, so that the embodiments may be modified in various ways.

What is claimed is:

1. An apparatus for providing a remote work environment, comprising:
   one or more processors; and
   executable memory for storing at least one program executed by the one or more processors,
   wherein the at least one program is configured to:
   perform Virtual Private Network (VPN) authentication in response to a request for remote access to a work network from a user terminal,
   perform user authentication in order to connect the user terminal, which succeeds in the VPN authentication, to the work network,
   allow access to a user to log into an Operating System (OS) of the user terminal only after VPN authentication and user authentication have both succeeded;
   decrypt an encrypted user data area of the user terminal that is connected to the work network after successfully logging into the Operating System of the user terminal, and
   provide the remote work environment to the user terminal based on the user data area through the work network.

2. The apparatus of claim 1, wherein the at least one program applies network management policies to the Operating System (OS) of the user terminal.

3. The apparatus of claim 2, wherein the at least one program sets a security-related function for controlling the user terminal using the network management policies.

4. The apparatus of claim 3, wherein the at least one program restricts at least one of a change in network settings, input/output of USB data, and a screen capture function based on the network management policies.

5. The apparatus of claim 3, wherein, when the VPN authentication succeeds, the at least one program maintains a connection of the user terminal to the work network, makes a setting to restrict a change in network settings based on the network management policies, and makes a setting to prevent the user terminal from connecting to an external Internet.

6. The apparatus of claim 1, wherein the user data area is capable of being accessed through the Operating System (OS) of the user terminal by being decrypted only while the user terminal maintains a connection to the work network, and is encrypted when the connection to the work network is disconnected.

7. A method for providing a remote work environment, performed by an apparatus for providing the remote work environment, comprising:
   performing Virtual Private Network (VPN) authentication in response to a request for remote access to a work network from a user terminal;
   performing user authentication in order to connect the user terminal, which succeeds in the VPN authentication, to the work network;
   allowing access to a user to log into an Operating System (OS) of the user terminal only after VPN authentication and user authentication have both succeeded;
   decrypting an encrypted user data area of the user terminal that is connected to the work network after successfully logging into the Operating System of the user terminal; and
   providing the remote work environment to the user terminal based on the user data area through the work network.

8. The method of claim 7, further comprising:
   applying network management policies to the Operating System (OS) of the user terminal.

9. The method of claim 8, wherein applying the network management policies is configured to set a security-related function for controlling the user terminal using the network management policies.

10. The method of claim 9, wherein applying the network management policies is configured to restrict at least one of a change in network settings, input/output of USB data, and a screen capture function based on the network management policies.

11. The method of claim 9, wherein applying the network management policies is configured to maintain a connection of the user terminal to the work network, to make a setting to restrict a change in network settings based on the network management policies, and to make a setting to prevent the user terminal from connecting to an external Internet when the VPN authentication succeeds.

12. The method of claim 7, wherein the user data area is capable of being accessed through an Operating System (OS) of the user terminal by being decrypted only while the user terminal maintains a connection to the work network, and is encrypted when the connection to the work network is disconnected.

* * * * *